United States Patent [19]

Welch

[11] Patent Number: 4,862,630

[45] Date of Patent: Sep. 5, 1989

[54] FISHING LURE

[76] Inventor: Raymond M. Welch, 675 7th Ave., Santa Cruz, Calif. 95062

[21] Appl. No.: 298,061

[22] Filed: Jan. 18, 1989

[51] Int. Cl.⁴ .............................................. A01K 85/00
[52] U.S. Cl. .................................. 43/42.26; 43/42.06; 43/42.37
[58] Field of Search ......................... 43/42, 42.03, 42.1, 43/42.22, 42.24, 42.26, 42.28, 42.3, 42.37, 42.38, 42.45, 42.53, 42.06

[56] References Cited

U.S. PATENT DOCUMENTS

| | | | |
|---|---|---|---|
| D. 121,694 | 7/1940 | Nichols | 43/42.26 |
| 1,230,968 | 6/1917 | Wilbur et al. | 43/42.26 |
| 2,303,097 | 11/1942 | Townsend et al. | 43/42.24 |
| 2,341,999 | 2/1944 | Lennington | 43/42.26 |
| 2,718,668 | 9/1955 | Burke | 43/42.24 |
| 3,105,317 | 10/1963 | Fox | 43/42.26 |
| 3,377,734 | 4/1968 | Snow | 43/42.24 |
| 3,389,490 | 6/1968 | Peters et al. | 43/42.1 |
| 3,438,144 | 4/1969 | Lincoln | 43/42.15 |
| 3,959,912 | 6/1976 | Lee | 43/42.1 |
| 4,516,352 | 5/1985 | Firmin | 43/42.26 |

Primary Examiner—Richard K. Seidel
Assistant Examiner—William S. Andes
Attorney, Agent, or Firm—Jerry T. Kearns

[57] ABSTRACT

A fishing lure has a crab-shaped body portion provided with a plurality of pairs of legs extending from opposite sides of the body. The lure is preferably molded from a flexible plastic material and is painted or otherwise colored to have a green upper surface with brown spots and a whitish undersurface in fluorescent color to simulate a live crab. A lower section of each the legs is provided with a cavity to catch water currents during use and produce life-like movement of the leg. The cross sectional areas of the cavities may be varied between legs to produce different rates of movement of the various legs. Wire stiffeners may be provided in an upper section of each leg to produce varying rates of movement between the upper and lower leg sections. The upper leg sections may be formed with a rearwardly extending stabilizing flap to control leg movement. A stabilizing fin may be provided in a recess formed in the undersurface of the body portion.

7 Claims, 4 Drawing Sheets

FISHING LURE

BACKGROUND OF THE INVENTION

1. Field of the Invention

The present invention relates to fishing lures, and more particularly pertains to a fishing lure which simulates the appearance and movement of a live crab. Crustaceans such as crayfish, shrimp and crabs are an extremely effective live bait for use in ocean fishing. However, it is difficult to keep these animals fresh and alive for protracted periods during fishing. When these animals die, their effectiveness as bait greatly diminishes. Various attempts have been made in the prior art to produce artificial fishing lures which simulate these live crustaceans. However, these conventional devices do not simulate the motion of the live animals and are thus of a limited effectiveness. In order to overcome these problems, the present invention provides a crab-shaped fishing lure which utilizes a plurality of pairs of legs adapted to simulate lifelike movement during use.

2. Description of the Prior Art

Various types of artificial crustacean fishing lures are known in the prior art. A typical example of such a fishing lure is to be found in U.S. Pat. No. Des. 121,694, which issued to F. Nichols on July 30, 1940. This patent discloses a shrimp-shaped lure having a plurality of pairs of legs. U.S. Pat. No. 2,718,668, which issued to C. Burke on Sept. 27, 1955, discloses a method of making a crustacean-shaped fishing lure by molding from initially liquid plastic materials. U.S. Pat. No. 3,377,734, which issued to L. Snow on Apr. 16, 1968, discloses a fishing lure in the shape of a shrimp having an elongated body molded of a flexible rubber-like material and having a plurality of pairs of legs. U.S. Pat. No. 3,438,144, which issued to D. Lincoln on Apr. 15, 1969, discloses an articulated crawfish-shaped fishing lure with a tail member adapted to oscillate during movement of the lure through the water. U.S. Pat. No. 4,516,352, which issued to H. Firmin on May 14, 1985, discloses an artificial crawfish lure formed from a resilient body having a cantilevered tail portion with a plurality of fabrication seams to allow lateral movement. When the lure is pulled through the water, water flowing around the tail portion imparts an oscillation to simulate the backward swimming motion of a live crawfish.

While the above mentioned devices are suited for their intended usage, none of these devices disclose a crab-shaped fishing lure having a plurality of pairs of legs provided with cavities for imparting life-like movement to the legs. Additionally, none of the aforesaid devices disclose the provision of cavities of varying cross sectional areas on different pairs of legs to vary the rates of movement thereof. Additional features of the present invention, not contemplated by the aforesaid prior art devices include the provision of an upper section of a leg with a stiffening member to produce varying rates of movement between upper and lower sections of the leg, the provision of rearwardly extending stabilizing flaps on the upper leg sections and the provision of a stabilizing fin assembly in a recess of the body portion. Inasmuch as the art is relatively crowded with respect to these various types of fishing lures, it can be appreciated that there is a continuing need for and interest in improvements to such fishing lures, and in this respect, the present invention addresses this need and interest.

SUMMARY OF THE INVENTION

In view of the foregoing disadvantages inherent in the known types of fishing lures now present in the prior art, the present invention provides an improved fishing lure. As such, the general purpose of the present invention, which will be described subsequently in greater detail, is to provide a new and improved fishing lure which has all the advantages of the prior art fishing lures and none of the disadvantages.

To attain this, representative embodiments of the concepts of the present invention are illustrated in the drawings and make use of a fishing lure which has a crab-shaped body portion provided with a plurality of pairs of legs extending from opposite sides of the body. The lure is preferably molded from a flexible plastic material and is painted or otherwise colored to have a green upper surface with brown spots and a whitish undersurface in fluorescent color to simulate a live crab. A lower section of each the legs is provided with a cavity to catch water currents during use and produce life-like movement of the leg. The cross sectional areas of the cavities may be varied between legs to produce different rates of movement of the various legs. Wire stiffeners may be provided in an upper section of each leg to produce varying rates of movement between the upper and lower leg sections. The upper leg sections may be formed with a rearwardly extending stabilizing flap to control leg movement. A stabilizing fin may be provided in a recess formed in the undersurface of the body portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims nor is it intended to be limiting as to the scope of the invention in any way.

It is therefore an object of the present invention to provide a new and improved fishing lure which has all the advantages of the prior art fishing lures and none of the disadvantages.

It is another object of the present invention to provide a new and improved fishing lure which may be easily and efficiently manufactured and marketed.

It is a further object of the present invention to provide a new and improved fishing lure which is of a durable and reliable construction.

An even further object of the present invention is to provide a new and improved fishing lure which is susceptible of a low cost of manufacture with regard to both materials and labor, and which accordingly is then susceptible of low prices of sale to the consuming public, thereby making such fishing lures economically available to the buying public.

Still yet another object of the present invention is to provide a new and improved fishing lure which provides in the apparatuses and methods of the prior art some of the advantages thereof, while simultaneously overcoming some of the disadvantages normally associated therewith.

Still another object of the present invention is to provide a new and improved fishing lure adapted to simulate a live crab.

Yet another object of the present invention is to provide a new and improved fishing lure dimensioned and colored to resemble a live crab and having a plurality of legs provided with cavities to catch water currents to simulate life-like leg movement.

Even still another object of the present invention is to provide a new and improved fishing lure having a crab-shaped body portion with a plurality of pairs of legs, having cavities of various different cross sectional areas to produce different rates of leg movements by trapping water currents therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
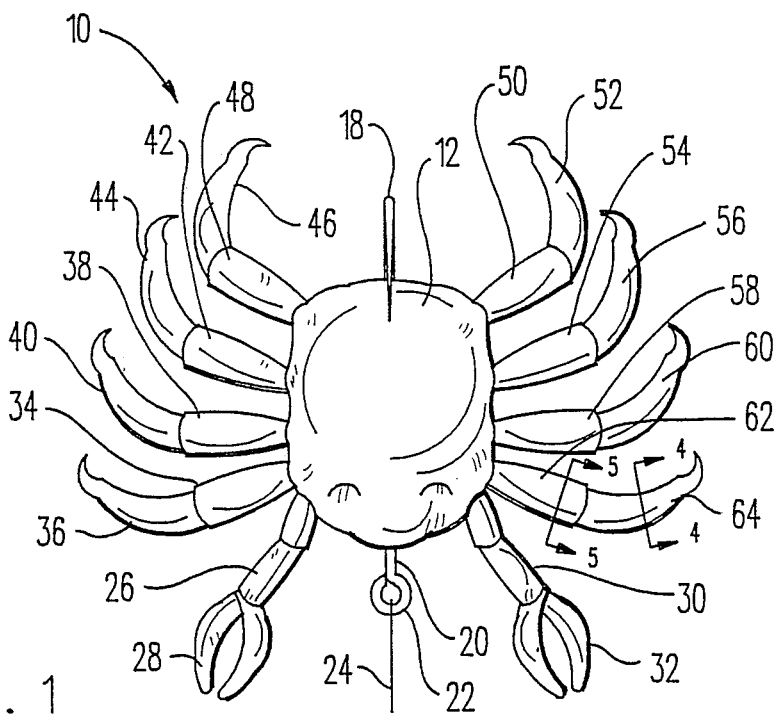
FIG. 1 is a top plan view of the fishing lure according to the first embodiment of the present invention.

With reference now to the drawings, and in particular to FIG. 1 thereof, a new and improved fishing lure embodying the principles and concepts of the present invention and generally designated by the reference numeral 10 will be described.

More specifically, it will be noted that the first embodiment 10 of the invention includes a crab-shaped body portion 12 having an eyelet 22 for securement to a fishing line 24 formed on the end of a shank 20. An opposite end 14 (FIG. 2) of the shank extends from a rear portion of the body 12 and terminates in a hook 18. A plurality of pairs of legs extend from opposite sides of the body 12. A first pair of legs or claws have upper sections 26 and 30 and lower claws 28 and 32. A second pair of legs has upper sections 34 and 62 and lower sections 36 and 64. A third pair of legs has upper sections 38 and 58 and lower sections 40 and 60. A fourth pair of legs has upper sections 42 and 54 and lower sections 44 and 56. A fifth pair of legs has upper sections 48 and 50 and lower sections 46 and 52. The legs and body portion 12 are preferably integrally molded from a flexible plastic material. The flexible plastic material may include pigments to produce a lifelike coloration or the lure may be painted after the molding operation. The coloration is preferably a greenish color with brown spots on the upper surface of the legs and body portion 12 and a whitish fluorescent coloration on the underside of the body portion 12 to resemble a natural live crab.

Figure 2:
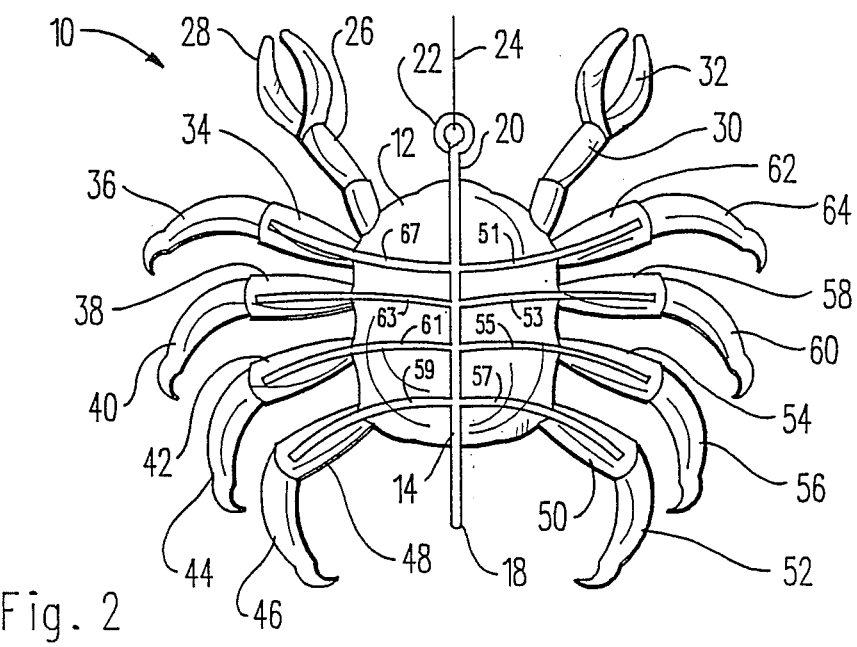
FIG. 2 is a bottom plan view of the fishing lure of FIG. 1.

As shown in FIG. 2, the shank 14 includes a plurality of transverse wire stiffening members 57, 59, 55, 61, 53, 63, 51 and 67. These stiffening members are preferably formed from a flexible wire material embedded in the flexible plastic material during the molding process. The stiffening members extend into the upper sections of each of the opposed pairs of legs and transversely through the body portion 12. It should be noted that the body portion 12 and upper leg sections have been illustrated as if transparent to illustrate the positioning of the interior shank 14 and the transverse stiffening members. In actuality, the pigmentation of the plastic material or the applied paint will obscure the shank 14 and stiffening members. The upper leg sections 34, 62, 38, 58, 42, 54, 48 and 50 are more rigid than the corresponding lower leg sections 36, 64, 40, 60, 44, 56, 46, and 52, by virtue of the encapsulated stiffening members. This produces different rates of movement between the upper and lower leg sections during use.

Figure 3:
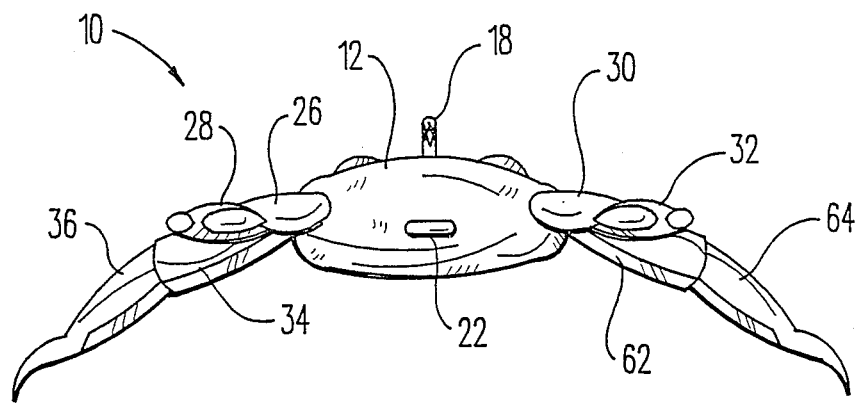
FIG. 3 is a front end view of the fishing lure of FIG. 1.

FIG. 3 provides a front end view of the fishing lure of FIG. 1.

Figure 4:
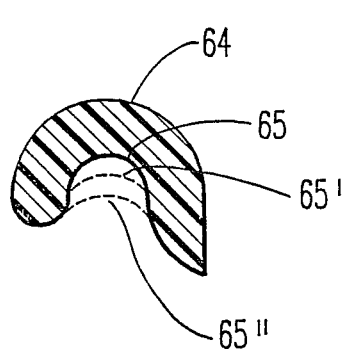
FIG. 4 is a transverse cross sectional view, taken along line 4—4 of FIG. 1.

As shown in the transverse cross sectional view of FIG. 4, the lower leg section 64 is provided with a cavity 65 formed in the bottom surface of the leg. As illustrated in phantom at 65′ and 65″, the depth of the cavity may be varied among the legs to produce different rates of movement. In use, water currents flowing into the cavity 65 cause the leg to move. By varying the depth of the cavity, the rate of movement is correspondingly varied.

Figure 5:
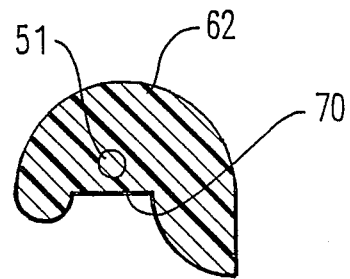
FIG. 5 is a transverse cross sectional view, taken along line 5—5 of FIG. 1.

FIG. 5 depicts a transverse cross sectional view, taken along line 5—5 of FIG. 1, which illustrates the stiffening member 51 received in the upper leg section 62. A shallow cavity 70 may be formed in the lower surface of the upper leg section 62 to produce a limited amount of movement.

Figure 6:
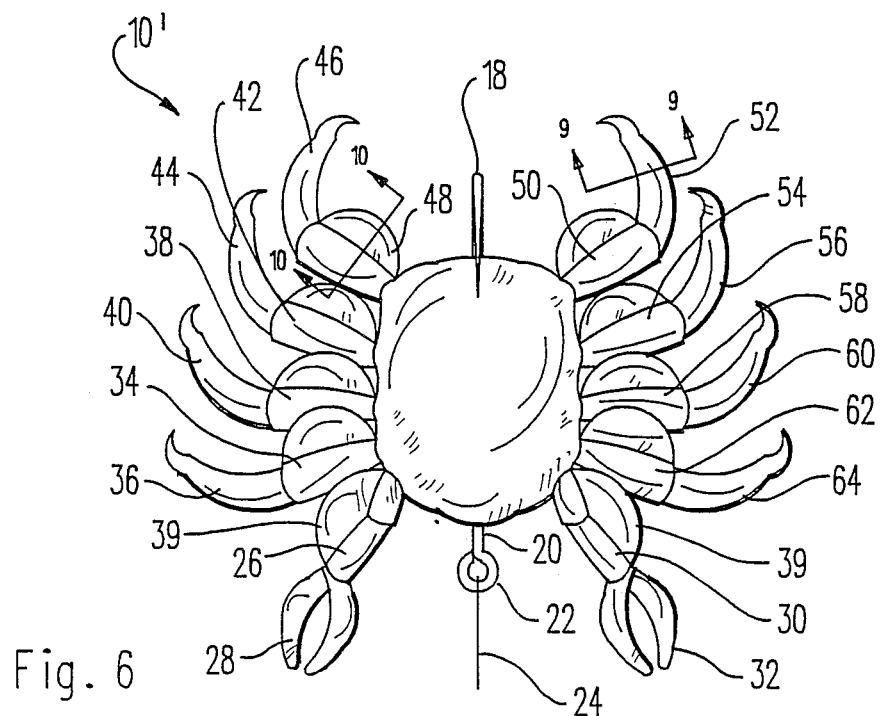
FIG. 6 is a top plan view illustrating a fishing lure according to a slightly modified second embodiment of the present invention.

FIG. 6 illustrates a top plan view of a fishing lure according to a slightly modified second embodiment of the present invention. The second embodiment 10' is similarly configured as described above with reference to the first embodiment 10, except for the following additional features. Each of the upper leg sections is provided with a thin flat rearwardly extending flap 39 which provides a stabilizing effect to the upper leg sections and prevents them from gyrating wildly as the lure is pulled through the water. The stabilizing flaps 39 are of a sufficient extent to abut the leading edge of the successive adjacent leg, and thus provide for additional stability.

Figure 7:
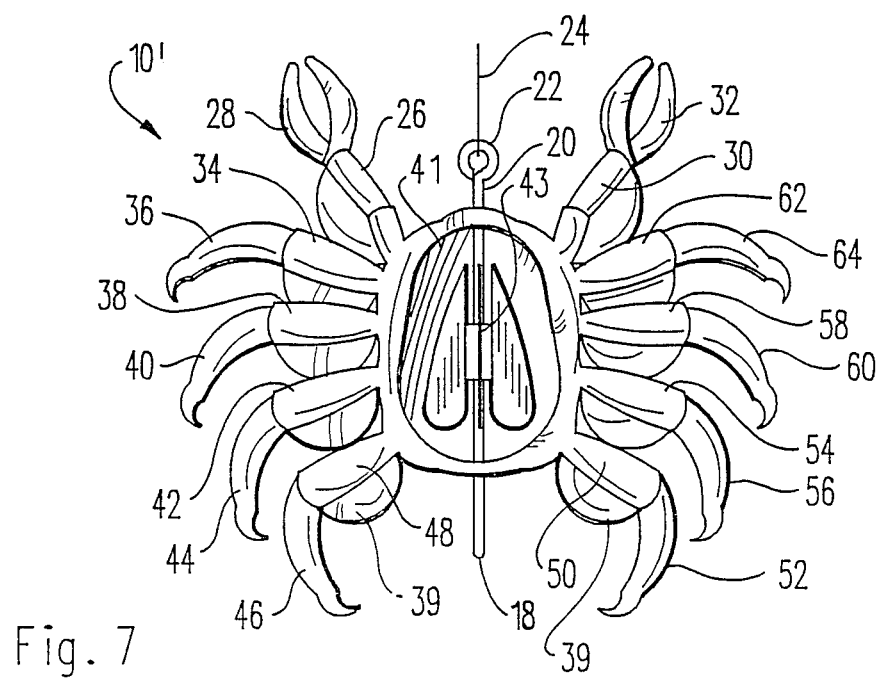
FIG. 7 is a bottom plan view illustrating the fishing lure of FIG. 6.

As shown in the bottom plan view of FIG. 7, the lure 10' has a recess or hollow section 41 formed in the bottom surface thereof. A stabilizing fin assembly 43 is disposed in the recess 41. The stabilizing fin assembly 43 serves to eliminate the lift produced by a flat bottom lure being pulled through the water. The recess 41 allows water flow around the fins 43 and causes the lure 10' to move through the water in a stable fashion, rather than gyrating wildly or fluttering, thus producing a more realistic motion.

Figure 8:
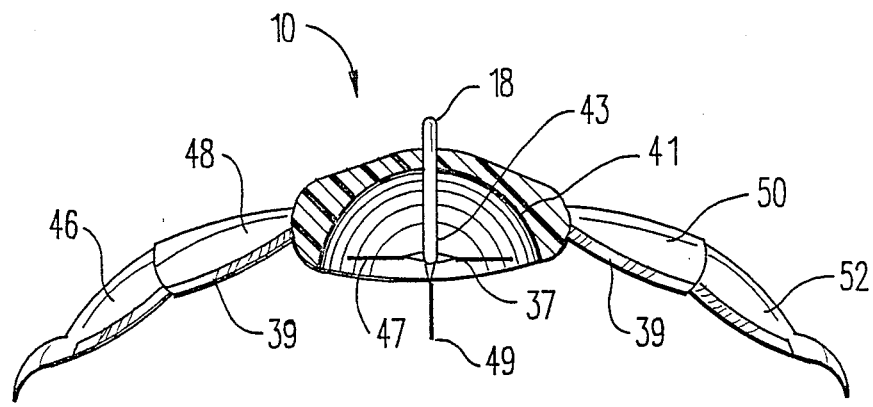
FIG. 8 is a front end view, partially in cross section, illustrating the fishing lure of FIG. 6.

FIG. 8 provides a front end view of the lure 10', partially in cross section, which illustrates the stabilizing fin assembly 43 within the recess 41. The stabilizing fin assembly 43 includes four radially extending fins 37, 47 and 49 (the remaining fin is obscured by the hook 18) disposed at 90 degree angular increments about the axis of the shank of the hook 18.

Figures 9, 10:
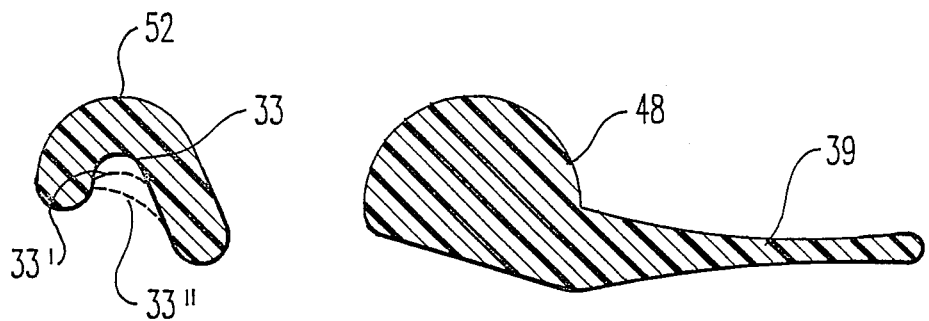
FIG. 9 is a transverse cross sectional view, taken along line 9—9 of FIG. 6.
FIG. 10 is a transverse cross sectional view, taken along line 10—10 of FIG. 6.

FIG. 9 depicts a cross sectional view, taken along line 9—9 of FIG. 6 which illustrates the cavity 33 formed in the lower leg section 52. As described previously with reference to FIG. 4, the cavity 33 may be varied in cross sectional area as illustrated at 33' and 33" between successive legs to vary the rate of movement of each leg.

FIG. 10 depicts a transverse cross sectional view, taken along line 10—10 of FIG. 6, which illustrates the stabilizing flap 39 on the upper leg section 48.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention Therefore, the foregoing is Considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure, comprising:
   a crab-shaped body portion molded from a flexible plastic material;
   a plurality of pairs of legs extending from opposite sides of said body portion;
   a hook attached at a rear end of said body portion;
   an eyelet for securement of a fishing line at a front end of said body portion; and
   a cavity in a bottom surface of at least one of said legs to produce motion of said leg by catching water currents in said cavity during use.

2. The fishing lure of claim 1, wherein a plurality of said legs are provided with cavities.

3. The fishing lure of claim 2, wherein said cavities vary in cross sectional area on different legs to produce different rates of movement of said legs.

4. The fishing lure of claim 1, wherein said legs each have an upper and a lower section.

5. The fishing lure of claim 4, further comprising wire stiffeners in said upper leg sections.

6. The fishing lure of claim 4, further comprising a rearwardly extending stabilizing flap on each of said upper leg sections.

7. The fishing lure of claim 1, further comprising a recess formed in a bottom surface of said body portion and a stabilizing fin assembly in said recess.

* * * * *